US011722352B2

(12) United States Patent
Jeon et al.

(10) Patent No.: US 11,722,352 B2
(45) Date of Patent: *Aug. 8, 2023

(54) CONFIGURABILITY AND SIGNALING FOR HALF-TONE SHIFT

(71) Applicant: Apple Inc., Cupertino, CA (US)

(72) Inventors: Jeongho Jeon, San Jose, CA (US); Joonyoung Cho, Portland, OR (US); Michael Faerber, Wolfratshausen (DE); Seunghee Han, San Jose, CA (US); Honglei Miao, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,890

(22) Filed: Apr. 11, 2022

(65) Prior Publication Data

US 2022/0239542 A1 Jul. 28, 2022

Related U.S. Application Data

(63) Continuation of application No. 16/614,106, filed as application No. PCT/US2018/037936 on Jun. 15, 2018, now Pat. No. 11,303,495.

(Continued)

(51) Int. Cl.
*H04L 27/26* (2006.01)
*H04L 5/00* (2006.01)

(52) U.S. Cl.
CPC ........ *H04L 27/2666* (2013.01); *H04L 5/0007* (2013.01)

(58) Field of Classification Search
CPC ...................... H04L 27/2601; H04L 27/26025
See application file for complete search history.

(56) References Cited

U.S. PATENT DOCUMENTS

| 8,699,440 B2 * | 4/2014 | Kim ................... H04W 72/042 370/465 |
| 11,290,510 B2 * | 3/2022 | Bouazizi ............... H04L 65/612 |

(Continued)

FOREIGN PATENT DOCUMENTS

| CN | 102804675 A | 11/2012 |
| CN | 105765876 A | 7/2016 |

OTHER PUBLICATIONS

First Office Action in related Chinese Application No. 201880029874.6, dated Aug. 12, 2021; 9 pages.

(Continued)

*Primary Examiner* — Kevin Kim
(74) *Attorney, Agent, or Firm* — Sterne, Kessler, Goldstein & Fox P.L.L.C.

(57) ABSTRACT

Described is an apparatus of a User Equipment (UE) operable to communicate with an Evolved Node-B (eNB) on a wireless network. The apparatus may comprise a first circuitry, a second circuitry, and a third circuitry. The first circuitry may be operable to process a configuration transmission carrying a half-tone shifting indicator. The second circuitry may be operable to select one or more subcarrier frequencies for Uplink (UL) transmission based on the half-tone shifting indicator. The third circuitry may be operable to generate a UL transmission for the one or more subcarrier frequencies. The half-tone shifting indicator may have a first value indicating application of a half-subcarrier offset, and a second value indicating no application of the half-subcarrier offset.

20 Claims, 8 Drawing Sheets

Related U.S. Application Data

(60) Provisional application No. 62/521,238, filed on Jun. 16, 2017.

(56) References Cited

U.S. PATENT DOCUMENTS

| | | |
|---|---|---|
| 2012/0069802 A1 | 3/2012 | Chen et al. |
| 2015/0189518 A1 | 7/2015 | Faerber |
| 2018/0220448 A1 | 8/2018 | Akkarakaran et al. |
| 2019/0357303 A1 | 11/2019 | Xiong et al. |
| 2020/0028658 A1 | 1/2020 | Baldemair et al. |
| 2020/0106510 A1 | 4/2020 | Song et al. |
| 2021/0160121 A1 | 5/2021 | Jeon et al. |

OTHER PUBLICATIONS

International Search Report and Written Opinion for PCT Application No. PCT/US18/37936, dated Nov. 6, 2018.

Ericsson, "On uplink half-tone shift", 3GPP Draft; R1-1709056; vol. RAN WG1; Hanqzhou, China; May 14, 2017.

Ericsson, "On uplink half-tone shift and LTE/NR co-existence", 3GPP Draft; R1-1704815; vol. RAN WG1; Spokane, WA, USA; Apr. 2, 2017.

Notice of Grant in related Chinese Application No. 201880029874. 6, dated Apr. 1, 2022; 5 pages.

\* cited by examiner

CONFIGURABILITY AND SIGNALING FOR HALF-TONE SHIFT

CLAIM OF PRIORITY

The present application is a continuation of U.S. patent application Ser. No. 16/614,106, filed Nov. 15, 2019, and entitled "CONFIGURABILITY AND SIGNALING FOR HALF-TONE SHIFT," which is a National Phase Entry of International Application PCT/US2018/37936, filed Jun. 15, 2018, and entitled "CONFIGURABILITY AND SIGNALING FOR HALF-TONE SHIFT," which claims the benefit of U.S. Provisional Patent Application Ser. No. 62/521,238 filed Jun. 16, 2017 and entitled "CONFIGURABILITY AND SIGNALING MECHANISM FOR HALF-TONE SHIFT TO NEW RADIO (NR) UPLINK (UL) WAVEFORM," all of which are herein incorporated by reference in their entireties.

BACKGROUND

A variety of wireless cellular communication systems have been implemented, including a 3rd Generation Partnership Project (3GPP) Universal Mobile Telecommunications Systems (UMTS) system, a 3GPP Long-Term Evolution (LTE) system, and a 3GPP LTE-Advanced (LTE-A) system Next-generation wireless cellular communication systems based upon LTE and LTE-A systems are being developed, such as a Fifth Generation (5G) wireless system/5G mobile networks system.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
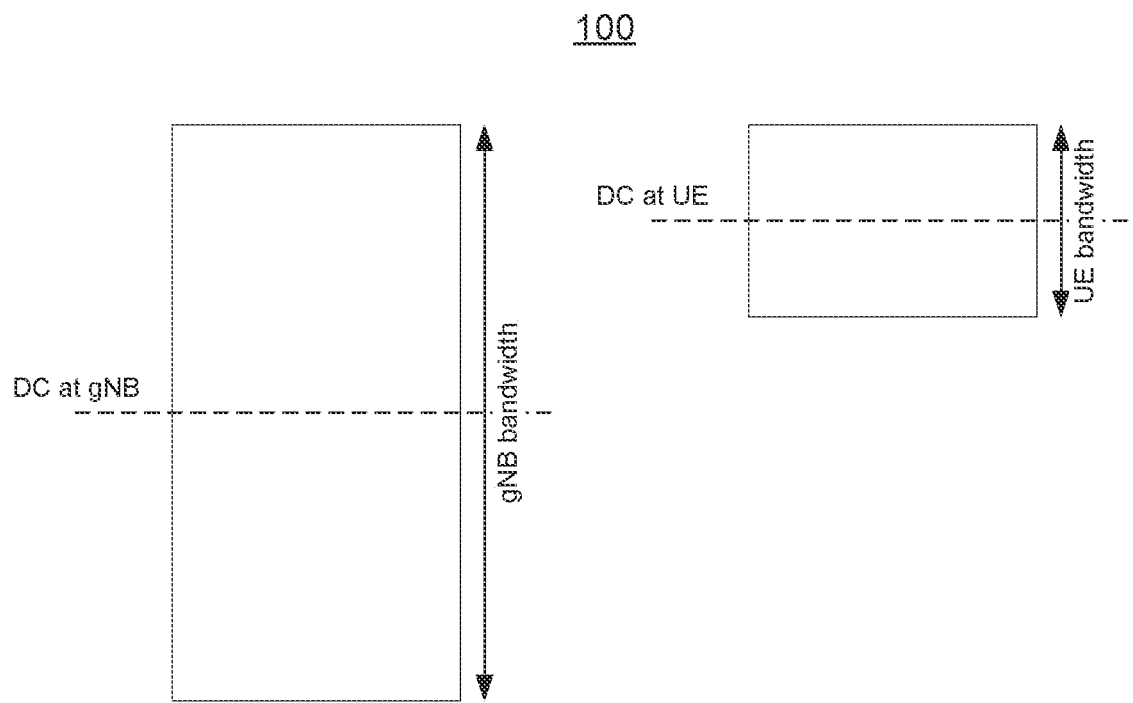
FIG. 1 illustrates different Direct Current (DC) subcarriers at a Fifth Generation (5G) capable Evolved Node-B (gNB) and a User Equipment (UE), in accordance with some embodiments of the disclosure.

Various wireless cellular communication systems have been implemented or are being proposed, including 3rd Generation Partnership Project (3GPP) Universal Mobile Telecommunications Systems (UMTS), 3GPP Long-Term Evolution (LTE) systems, 3GPP LTE-Advanced (LTE-A) systems, and 5th Generation (5G) wireless systems/5G mobile networks systems/5G New Radio (NR) systems.

Mobile cellular communication systems have evolved significantly overtime. Next generation 5G wireless communication systems, for which NR systems may be targeted, may provide greatly improved performance compared to current 4G system in many respects, including improved spectral efficiency, lower latency, higher reliability, and so on. These multi-dimensional goals are driven by different services and applications, including enhanced Mobile Broadband (eMBB), Ultra-Reliable Low Latency Communication (URLLC), and so forth. As a result, NR systems targeted to be 5G systems may enrich people lives with faster, more responsive, and more reliable wireless connectivity solutions.

With respect to various embodiments, disclosed herein are mechanisms and methods for half-tone shifting when NR shares an Uplink (UL) carrier with LTE and 15 kilohertz (kHz) subcarrier spacing (SCS) is used for NR. Since UL sharing may enable or facilitate smooth migration for operators from LTE networks to NR networks, 15 kHz SCS may be employed for NR (e.g., in LTE-NR shared UL carriers). Accordingly, the disclosed mechanisms and methods may advantageously facilitate determinations as to whether or not to apply a half-tone shift to NR UL.

In various embodiments, NR devices may be configurable to apply a 7.5 kHz frequency shift or not. In some embodiments, a Minimum System Information (MSI) transmission and/or a Remaining MSI (RMSI) transmission may indicate whether or not to apply a 7.5 kHz frequency shift for UL transmission. For some embodiments, a UE may be configured by dual connectivity to also operate NR with an indicator of half-tone shifting (e.g., a Layer 1 (L1) indicator, a Layer 2 (L2) indicator, a Media Access Control (MAC) Control Element (CE) indicator, and/or a higher layer signaling indicator). In some embodiments, the signaling mechanism may be implicit, in the sense that the 7.5 kHz shift may be linked with a frequency band and no explicit signaling might be performed. For some embodiments, the signaling mechanism may apply to either a baseband option or a Radio Frequency (RF) option for a 7.5 kHz frequency shift of UL waveforms.

In some embodiments, A UE may ignore a 7.5 kHz shift (e.g., half-tone shift) configuration, if the configured SCS is other than 15 kHz SCS. For some embodiments, a UE may follow a 7.5 kHz shift configuration for all SCS configurations. In some embodiments, a UE may ignore a 7.5 kHz shift configuration if the configured waveform is a Cyclic Prefix Orthogonal Frequency Division Multiplexing (CP-OFDM) waveform. For some embodiments, a UE may follow a 7.5 kHz shift configuration regardless of the configured UL waveform (e.g., for either a CP-OFDM waveform, or a Discrete Fourier Transform Spread Orthogonal Frequency Division Multiplexing (DFT-s-OFDM) waveform).

With respect to various embodiments, due to Local Oscillator (LO) and/or interference self-mixing at the UE side, a signal quality at a DC subcarrier may be very low. In LTE, all non-Machine-Type-Communication (MTC) UEs may support a full system bandwidth so that an eNB transmitter and a UE receiver may share the same DC subcarrier. As a result, a central subcarrier of a system bandwidth (e.g., a DC subcarrier) may simply be discarded for construction of a physical resource block.

However, in an NR system, not all UEs might support the same system bandwidth as the base-station (e.g., the gNB and/or 5G-NB).

FIG. 1 illustrates different Direct Current (DC) subcarriers at a 5G capable Evolved Node-B (gNB) and a User Equipment (UE), in accordance with some embodiments of the disclosure. In a scenario 100, a central subcarrier of an operating bandwidth of a gNB might not be the same as a central subcarrier of an operating bandwidth of a UE. Hence, subject to UE transceiver architecture factors, it is possible that a DC subcarrier of a gNB and a DC subcarrier of a UE may be different.

Meanwhile, a DC subcarrier of a transmitter side may be indicated to a UE. For example, a UE may be informed as to a location of the DC subcarrier, or whether a DC subcarrier is not present within a receiver bandwidth. However, DC handling at a receiver side may be subject to receiver implementation. If a DC subcarrier of a UE receiver has very poor signal quality, it may be desirable to avoid using it for signal transmission, since the UE may puncture it at the receiver side at any rate. In addition, DC subcarrier handling at a receiver might not be addressed specifically in the standard.

Accordingly, disclosed herein are various mechanisms and methods pertaining to UE specific reserved resource signaling, such as for handling a UE transceiver DC subcarrier. Since NR systems may employ reserved resource to support better forward-compatibility, the proposed method may advantageously use a similar framework such that DC handling may be performed in a relatively generic, network transparent manner.

Moreover, in various embodiments, a UE-oriented reserved resource may be requested not only with respect to a DC subcarrier, but also with respect to strong self-interference, or other sorts of interferences.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy LTE capable Evolved Node-B (eNB), a next-generation or 5G capable eNB, a centimeter-wave (cmWave) capable eNB or a cmWave small cell, a millimeter-wave (mmWave) capable eNB or an mmWave small cell, an Access Point (AP), and/or another base station for a wireless communication system. The term "gNB" may refer to a 5G-capable or NR-capable eNB. For purposes of the present disclosure, the term "UE" may refer to a legacy LTE capable UE, an mmWave capable UE, a cmWave capable UE, a Station (STA), and/or another mobile equipment for a wireless communication system. The term "UE" may also refer to a next-generation or 5G capable UE.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In various embodiments, resources may span various Resource Blocks (RBs), Physical Resource Blocks (PRBs), and/or time periods (e.g., frames, subframes, and/or slots) of a wireless communication system. In some contexts, allocated resources (e.g., channels, Orthogonal Frequency-Division Multiplexing (OFDM) symbols, subcarrier frequencies, resource elements (REs), and/or portions thereof) may be formatted for (and prior to) transmission over a wireless communication link. In other contexts, allocated resources (e.g., channels, OFDM symbols, subcarrier frequencies, REs, and/or portions thereof) may be detected from (and subsequent to) reception over a wireless communication link.

With respect to various embodiments, without a half-tone shift (e.g., a 7.5 kHz frequency offset), NR and/or LTE UL subcarriers may be misaligned with each other, and an inter-subcarrier interference may thereby occur between NR and LTE UL transmissions. Some implementation-based solutions may be considered, such as a guard band between LTE and NR UL. At least 1 PRB guard band may be desirable, and the guard band may be increased for higher modulation order and/or code rate. If a shared UL resource is bisected into two, one part for LTE and the other part for NR, then only one guard band may be desirable.

In one example, a 20 megahertz (MHz) carrier may be bisected into two 10 MHz parts. Given LTE Physical Uplink Control Channel (PUCCH) transmission on both edges of the carrier, if only one guard band is desired, LTE UEs may be disposed to being configured in such a way that the LTE carrier bandwidth is substantially 10 MHz. By doing so, LTE PUCCH transmissions may be confined within the 10 MHz bandwidth part. However, configuring a carrier bandwidth to a fixed bisected value may significantly impact a flexibility of the resource allocation between the two systems. Moreover, if fully flexible UL sharing between LTE and NR is desirable, a greater number of guard bands may be used between the LTE and NR PRBs.

In various embodiments, there may be at least two options for employing half-tone shifts. A first option may pertain to baseband implementations, which may employ a half-tone shift (7.5 kHz frequency offset) at a baseband signal generation, similar to an LTE UL half-tone shift. Note that in LTE, the introduction of the half-tone shift may be related to the adoption of DFT-S-OFDM waveforms and the use of direct frequency conversion, in order to avoid breaking a single-carrier property due to a nulling of a DC subcarrier for a single UE allocation scenario. By shifting subcarriers, the direct impact of signal distortion at a zero frequency could be avoided, but the distortion may be spread over adjacent subcarriers.

In cases of UL OFDM waveforms, a half-tone shift is not necessarily the most desirable choice to avoid DC distortion as may be the case with DFT-S-OFDM waveforms. With half-tone shifting, DC distortion may spread to other subcarriers. However, that shifting may be considered in the context of a shared UL carrier with LTE. From the perspective of avoiding an inter-subcarrier interference to LTE, it may still be advantageous to apply a half-tone shift to OFDM waveform.

A second option may pertain to RF implementations, which may achieve the half-tone shift (7.5 kHz frequency offset) for NR UL at the RF by up-converting a baseband signal to a carrier frequency, with the addition of a 7.5 kHz offset. Fundamentally, the baseband solution and the RF solution may achieve similar goals. For standalone NR, a Phase Locked Loop (PLL) may be configured to a carrier frequency plus a 7.5 kHz offset. However, for dual connectivity of LTE and NR, the RF solution may not be the most desirable solution. This may be because a dual connectivity UE may be disposed to maintaining two different carrier frequencies for the same shared UL carrier. This in turn may lead a UE to implement two PLLs for a single shared UL carrier, unless the UE alternates between two carrier frequencies using one PLL.

Alternatively, a UE may have one PLL, but may implement a 7.5 kHz frequency shifter between a baseband signal output and an RF block. This may not be fundamentally different from a baseband solution, except that a Radio Access Network 1 (RANI) specification might not specify the shifting.

Accordingly, various mechanisms and methods disclosed herein may pertain to signaling for half-tone shifts. Half-tone shifts may be signaled in a variety of ways. In some embodiments, a signaling mechanism may apply to both a baseband option and an RF options for 7.5 kHz frequency shift of UL waveforms. For some embodiments, NR may have configurability to apply the 7.5 kHz frequency shift or to not apply the shift. For standalone NR, an MSI or an RMSI may indicate whether to apply the 7.5 kHz frequency shift for UL transmission or not. In some embodiments, for dual connectivity of LTE and NR, a UE may access an LTE Primary Cell (PCell) and may be configured by dual connectivity to also operate NR with an indication of half-tone shifting (e.g., an L1 based indicator, an L2 based indicator, a MAC CE based indicator, or a higher layer signaling based indicator).

Moreover, half-tone shifts that have been signaled or indicated may be adopted or ignored for various reasons. For some embodiments, a UE may ignore a 7.5 kHz shift configuration, if the configured SCS is other than a 15 kHz SCS. In some embodiments, a UE may follow a 7.5 kHz shift configuration for all SCS configurations. For some embodiments, a 7.5 kHz shift may be linked with a frequency band. If an LTE-NR shared frequency band is configured, a UE may apply the 7.5 kHz shift. The UE may ignore a 7.5 kHz shift if the configured SCS is other than a 15 kHz SCS. In some embodiments, the UE may apply a 7.5 kHz shift for all SCS configurations. For some embodiments, a UE may ignore a 7.5 kHz shift configuration if the configured waveform is CP-OFDM. In some embodiments, a UE may follow a 7.5 kHz shift configuration regardless of a configured UL waveform (e.g., either CP-OFDM or DFT-S-OFDM).

With respect to various embodiments, various embodiments may incorporate mechanisms and methods for UE-oriented and/or UE-specific reserved resource scheduling. In a reserved resource signaling method, a UE may determine which subcarrier or set of subcarriers (e.g., a continuous set of subcarriers, or a non-continuous set of subcarriers) shall not be used, either constantly or periodically, when a data transmission in the Downlink (DL) or UL is scheduled for the UE.

As a result, various parameters and/or indicators to facilitate UE-oriented reserved resource signaling may include: a parameter for and/or indicator of link direction (e.g., whether for DL or for UL); a parameter for and/or indicator of an aspect of a numerology (e.g., comprising a subcarrier spacing); a parameter for and/or indicator of a set of subcarriers in a respective UE operating bandwidth (e.g., one subcarrier, or several continuous subcarriers, or several non-continuous subcarriers); and/or a periodicity of reserved subcarriers in time units, such as numbers of OFDM symbols (e.g., for a first value such as a value of "1," a subcarrier or set of subcarriers may be reserved for all continuous transmission).

Upon the reception of UE-oriented reserved resource signaling, when a gNB schedules a UE data transmission in either the DL or the UL, the gNB may map the corresponding data symbols around those reserved resource elements. Accordingly, reserved REs may be avoided, and data might not be transmitted on them.

Figure 2:
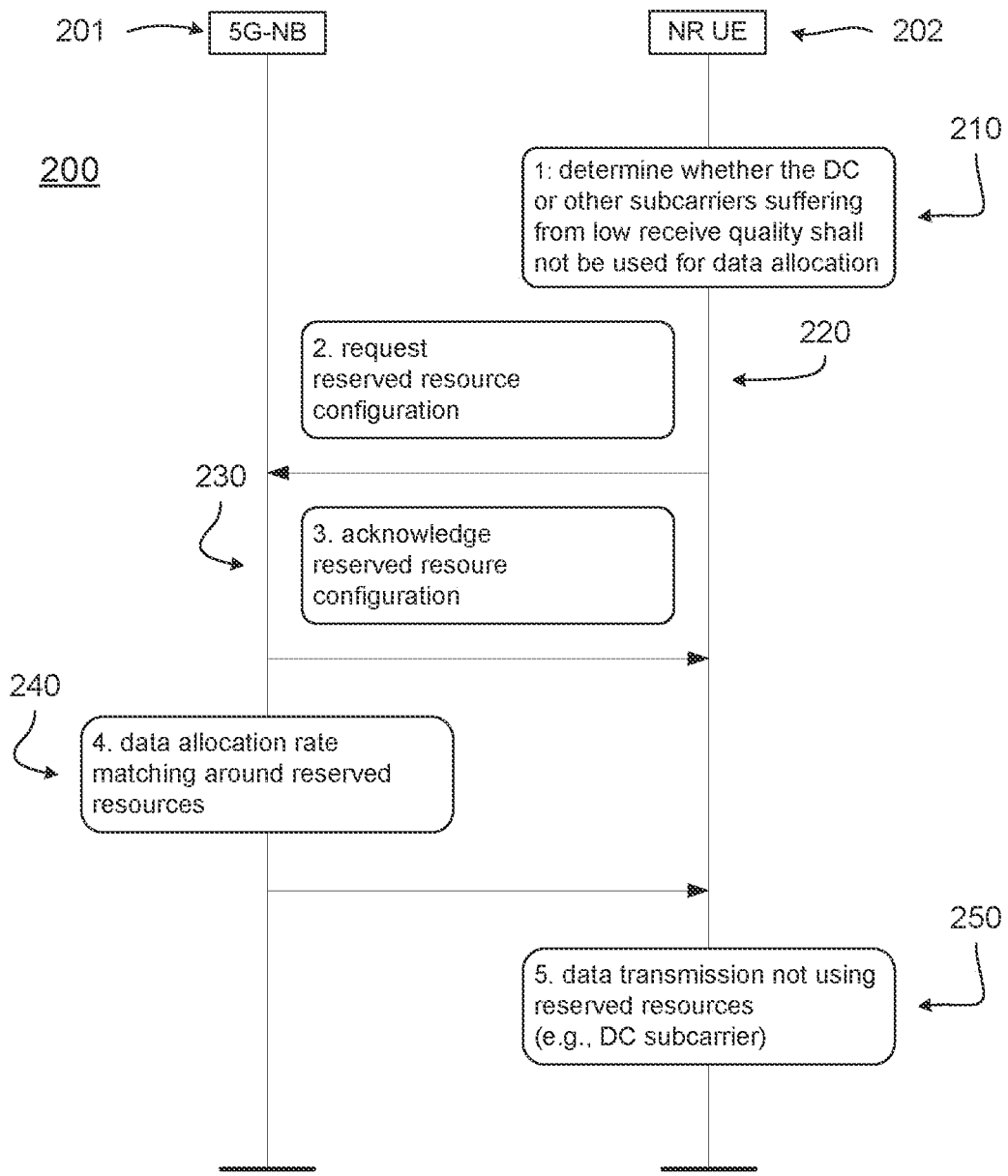
FIG. 2 illustrates a DE-oriented configuration of reserved resources, in accordance with some embodiments of the disclosure.

FIG. 2 illustrates a UE-oriented configuration of reserved resources, in accordance with some embodiments of the disclosure. A procedure 200 between a gNB 201 and a UE 202 may comprise a first portion 210, a second portion 220, a third portion 230, a fourth portion 240, and/or a fifth portion 250.

Portion 210 may pertain to a determination of a reserved resource configuration at UE 202. In portion 210, UE 202 may determine one or more subcarriers (e.g., continuous subcarriers or non-continuous subcarriers) to be configured as reserved resources not for use in data scheduling. In some embodiments, these reserved resources may correspond with a UE DC subcarrier which may be different from a gNB DC subcarrier. In some embodiments, these subcarriers may be some REs which suffer from strong self-interference or other interference, constant or periodic, so that a receive signal quality in these resources is very poor. Depending on the type of interference of these victim resources (e.g., constant interference or periodic interference), various indicators and/or parameters of the one or more reserved resources may be appropriately provided.

Various indicators and/or parameters of the reserved resources may comprise: a link direction (e.g., DL or UL); an aspect of a numerology of the reserved resources (e.g., a subcarrier spacing); a set of subcarriers in a respective UE operating bandwidth (e.g., one subcarrier, or several continuous subcarriers, or several non-continuous subcarriers); and/or a periodicity of reserved-resource subcarriers in time units, such as OFDM symbols (which may include at least one value, such as "1," for indicating that resources are reserved for all continuous transmission).

Portion 220 may pertain to a reserved-resource configuration request. In portion 220, once one or more parameters of reserved resources are established or determined, UE 202 may send a reserved resource configuration request to gNB 201.

Portion 230 may pertain to an acknowledgement of reserved-resource configuration. In portion 230, with a reception of a reserved-resource configuration request, and potentially in the absence of conflicts, gNB 202 may acknowledge the configuration request to UE 201.

Portion 240 may pertain to a gNB resource allocation for scheduled data. In portion 240, after an acknowledgement of a reserved-resource configuration, gNB 201 may schedule DL or UL data without using those reserved resources (e.g., by avoiding resources to be unused). If some reserved resources are in the range of a scheduled bandwidth, they may be rate-matched around.

Portion 250 may pertain to data transmission. In portion 250, with a resource allocation from portion 240, scheduled data may be transmitted in a respective DL or UL channel.

Figure 3:
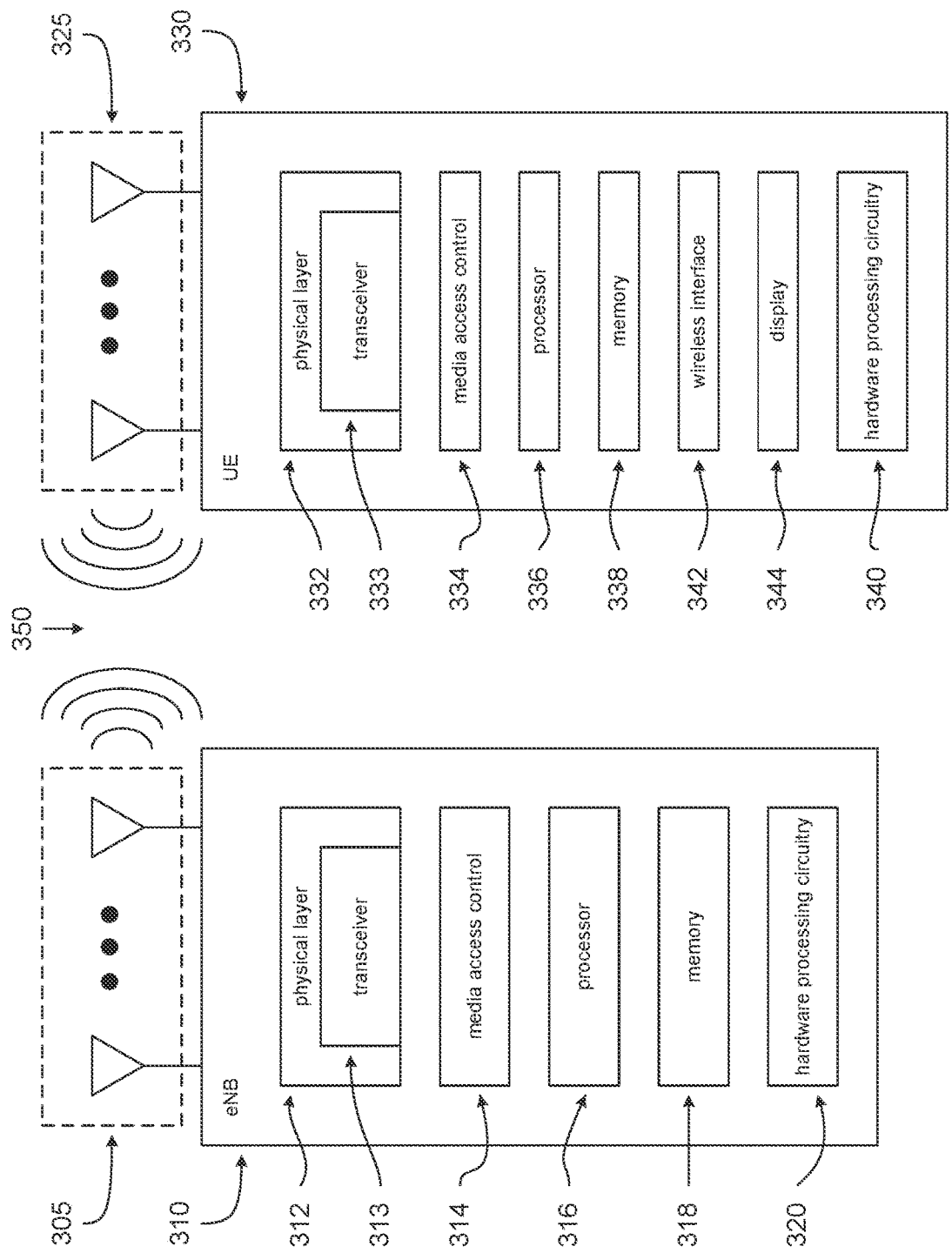
FIG. 3 illustrates an Evolved Node-B (eNB) and a UE, in accordance with some embodiments of the disclosure.

FIG. 3 illustrates an eNB and a UE, in accordance with some embodiments of the disclosure. FIG. 3 includes block diagrams of an eNB 310 and a UE 330 which are operable to co-exist with each other and other elements of an LTE network. High-level, simplified architectures of eNB 310 and UE 330 are described so as not to obscure the embodiments. It should be noted that in some embodiments, eNB 310 may be a stationary non-mobile device.

eNB 310 is coupled to one or more antennas 305, and UE 330 is similarly coupled to one or more antennas 325. However, in some embodiments, eNB 310 may incorporate or comprise antennas 305, and UE 330 in various embodiments may incorporate or comprise antennas 325.

In some embodiments, antennas 305 and/or antennas 325 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 305 are separated to take advantage of spatial diversity.

eNB 310 and UE 330 are operable to communicate with each other on a network, such as a wireless network. eNB 310 and UE 330 may be in communication with each other over a wireless communication channel 350, which has both a downlink path from eNB 310 to UE 330 and an uplink path from UE 330 to eNB 310.

As illustrated in FIG. 3, in some embodiments, eNB 310 may include a physical layer circuitry 312, a MAC (media access control) circuitry 314, a processor 316, a memory 318, and a hardware processing circuitry 320. A person skilled in the art will appreciate that other components not shown may be used in addition to the components shown to form a complete eNB.

In some embodiments, physical layer circuitry 312 includes a transceiver 313 for providing signals to and from UE 330. Transceiver 313 provides signals to and from UEs or other devices using one or more antennas 305. In some embodiments, MAC circuitry 314 controls access to the wireless medium. Memory 318 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 320 may comprise logic devices or circuitry to perform various operations. In some embodiments, processor 316 and memory 318 are arranged to perform the operations of hardware processing circuitry 320, such as operations described herein with reference to logic devices and circuitry within eNB 310 and/or hardware processing circuitry 320.

Accordingly, in some embodiments, eNB 310 may be a device comprising an application processor, a memory, one or more antenna ports, and an interface for allowing the application processor to communicate with another device.

As is also illustrated in FIG. 3, in some embodiments, UE 330 may include a physical layer circuitry 332, a MAC circuitry 334, a processor 336, a memory 338, a hardware processing circuitry 340, a wireless interface 342, and a display 344. A person skilled in the art would appreciate that other components not shown may be used in addition to the components shown to form a complete UE.

In some embodiments, physical layer circuitry 332 includes a transceiver 333 for providing signals to and from eNB 310 (as well as other eNBs). Transceiver 333 provides signals to and from eNBs or other devices using one or more antennas 325. In some embodiments, MAC circuitry 334 controls access to the wireless medium. Memory 338 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 342 may be arranged to allow the processor to communicate with another device. Display 344 may provide a visual and/or tactile display for a user to interact with UE 330, such as a touch-screen display. Hardware processing circuitry 340 may comprise logic devices or circuitry to perform various operations. In some embodiments, processor 336 and memory 338 may be arranged to perform the operations of hardware processing circuitry 340, such as operations described herein with reference to logic devices and circuitry within UE 330 and/or hardware processing circuitry 340.

Accordingly, in some embodiments, UE 330 may be a device comprising an application processor, a memory, one or more antennas, a wireless interface for allowing the application processor to communicate with another device, and a touch-screen display.

Elements of FIG. 3, and elements of other figures having the same names or reference numbers, can operate or function in the manner described herein with respect to any such figures (although the operation and function of such elements is not limited to such descriptions). For example, FIGS. 4 and 7-8 also depict embodiments of eNBs, hardware processing circuitry of eNBs, UEs, and/or hardware processing circuitry of UEs, and the embodiments described with respect to FIG. 3 and FIGS. 4 and 7-8 can operate or function in the manner described herein with respect to any of the figures.

In addition, although eNB 310 and UE 330 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 4:
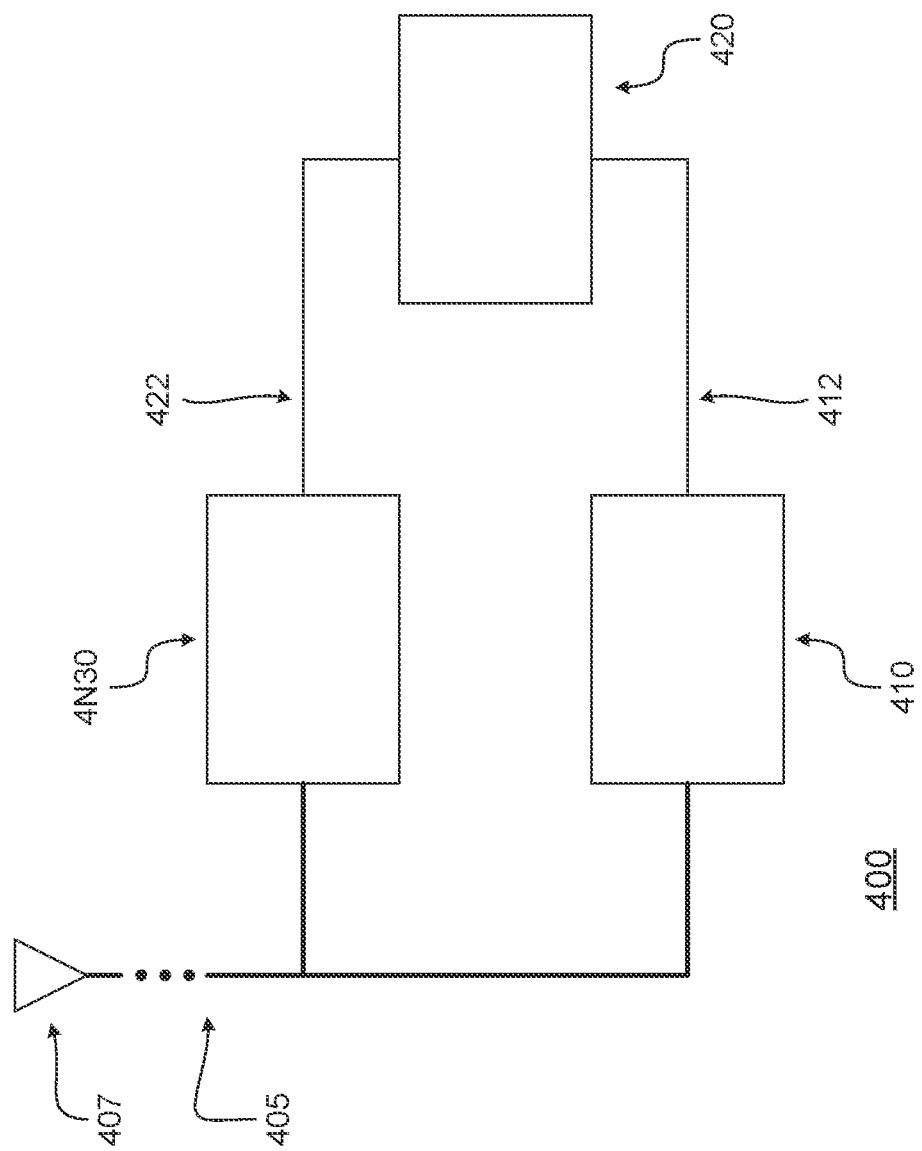
FIG. 4 illustrates hardware processing circuitries for a UE for half-tone shifting when New Radio (NR) systems share an Uplink (UL) carrier with 3rd Generation Partnership Project (3GPP) Long-Term Evolution (LTE) systems, and for UE specific reserved resource signaling, in accordance with some embodiments of the disclosure.

FIG. 4 illustrates hardware processing circuitries for a UE for half-tone shifting when NR systems share a UL carrier with 3GPP LTE systems, and for UE specific reserved resource signaling, in accordance with some embodiments of the disclosure. With reference to FIG. 3, a UE may include various hardware processing circuitries discussed herein (such as hardware processing circuitry 400 of FIG. 4), which may in turn comprise logic devices and/or circuitry operable to perform various operations. For example, in FIG. 3, UE 330 (or various elements or components therein, such as hardware processing circuitry 340, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 336 (and/or one or more other processors which UE 330 may comprise), memory 338, and/or other elements or components of UE 330 (which may include hardware processing circuitry 340) may be arranged to perform the operations of these hardware processing circuitries, such as operations described herein with reference to devices and circuitry within these hardware processing circuitries. In some embodiments, processor 336 (and/or one or more other processors which UE 330 may comprise) may be a baseband processor.

Returning to FIG. 4, an apparatus of UE 330 (or another UE or mobile handset), which may be operable to communicate with one or more eNBs on a wireless network, may comprise hardware processing circuitry 400. In some embodiments, hardware processing circuitry 400 may comprise one or more antenna ports 405 operable to provide various transmissions over a wireless communication channel (such as wireless communication channel 350). Antenna ports 405 may be coupled to one or more antennas 407 (which may be antennas 325). In some embodiments, hardware processing circuitry 400 may incorporate antennas 407, while in other embodiments, hardware processing circuitry 400 may merely be coupled to antennas 407.

Antenna ports 405 and antennas 407 may be operable to provide signals from a UE to a wireless communications channel and/or an eNB, and may be operable to provide signals from an eNB and/or a wireless communications channel to a UE. For example, antenna ports 405 and antennas 407 may be operable to provide transmissions from UE 330 to wireless communication channel 350 (and from there to eNB 310, or to another eNB). Similarly, antennas 407 and antenna ports 405 may be operable to provide transmissions from a wireless communication channel 350 (and beyond that, from eNB 310, or another eNB) to UE 330.

Hardware processing circuitry 400 may comprise various circuitries operable in accordance with the various embodiments discussed herein. With reference to FIG. 4, hardware processing circuitry 400 may comprise a first circuitry 410, a second circuitry 420, and/or a third circuitry 430.

With respect to various embodiments, first circuitry 410 may be operable to process a configuration transmission carrying a half-tone shifting indicator. Second circuitry 420 may be operable to select one or more subcarrier frequencies for UL transmission based on the half-tone shifting indicator. First circuitry 410 may be operable to provide information regarding the half-tone shifting indicator to second circuitry 420 via an interface 412. Third circuitry 430 may be operable to generate a UL transmission for the one or more subcarrier frequencies. Second circuitry 420 may be operable to provide information regarding the one or more subcarrier frequencies for UL transmission to third circuitry 430 via an interface 422. The half-tone shifting indicator may have a first value indicating application of a half-subcarrier offset, and a second value indicating no application of the half-subcarrier offset. Hardware processing circuitry 400 may also comprise an interface for generating UL sending UL transmission to a transmission circuitry and for receiving DL transmissions from a receiving circuitry.

In some embodiments, the UE may be configured to have a subcarrier spacing of 15 kHz, and the half-tone shift has a magnitude of 7.5 kHz. For some embodiments, the configuration transmission may be a Radio Resource Control (RRC) signaling transmission. In some embodiments, the UL transmission may comprise at least one of: a CP-OFDM waveform, or a DFT-s-OFDM waveform.

For some embodiments, third circuitry 430 may be operable to generate an RF shifting indicator for an RF circuitry based on the half-tone shifting indicator.

With respect to various embodiments, second circuitry 420 may be operable to determine one or more subcarrier frequencies to be unused for data allocation. Third circuitry 430 may be operable to generate an UL configuration transmission carrying a reserved resource configuration request indicator. First circuitry 410 may be operable to process a DL configuration transmission carrying a reserved resource configuration acknowledgement indicator. First circuitry 410 may also be operable to process a DL data transmission that is absent from transmission on the one or more subcarrier frequencies to be unused for data allocation. Second circuitry 420 may be operable to provide information regarding the one or more subcarrier frequencies to be unused for data allocation to first circuitry 410 via indicator 412. Hardware processing circuitry 400 may also comprise an interface for generating UL sending UL transmission to a transmission circuitry and for receiving DL transmissions from a receiving circuitry.

In some embodiments, at least one of the one or more subcarrier frequencies to be unused for data allocation may correspond with a DC subcarrier frequency of the UE. For some embodiments, the one or more subcarrier frequencies to be unused for data allocation may be continuous in the frequency domain. In some embodiments, the reserved resource configuration request indicator may comprise an indicator of link direction, an indicator of numerology, an indicator of one or more subcarriers in an operating bandwidth of the UE, and/or an indicator of a periodicity of reserved subcarriers in the time domain. In some embodiments, the periodicity of reserved subcarriers may have a value indicating the one or more subcarrier frequencies are to be continuously unused.

In some embodiments, first circuitry 410, second circuitry 420, and/or third circuitry 430 may be implemented as separate circuitries. In other embodiments, first circuitry 410, second circuitry 420, and/or third circuitry 430 may be combined and implemented together in a circuitry without altering the essence of the embodiments.

Figure 5:
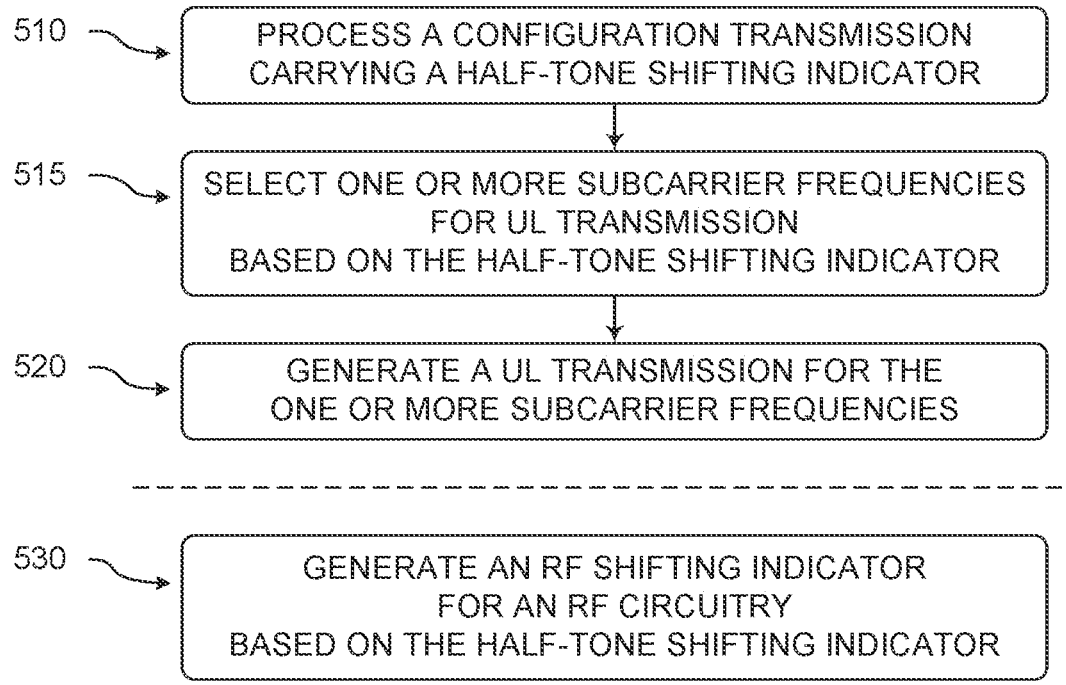
FIG. 5 illustrates methods for a UE for half-tone shifting when NR systems share a UL carrier with 3GPP LTE systems, in accordance with some embodiments of the disclosure.
Figure 6:
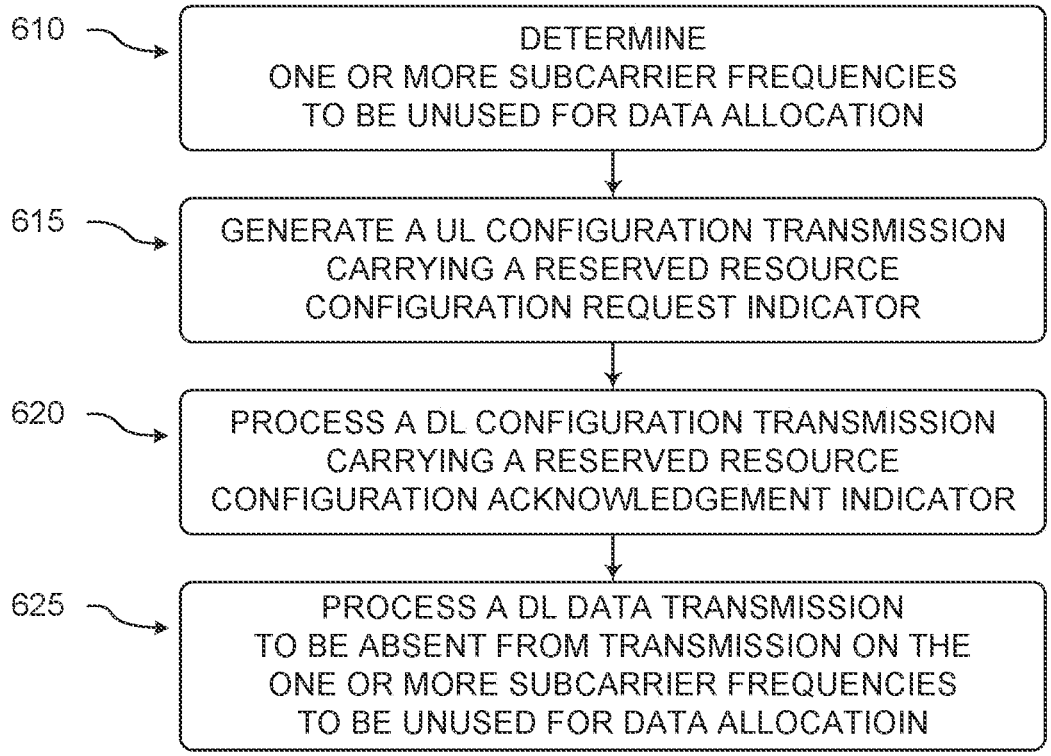
FIG. 6 illustrates methods for a UE for UE specific reserved resource signaling, in accordance with some embodiments of the disclosure.

FIG. 5 illustrates methods for a UE for half-tone shifting when NR systems share a UL carrier with 3GPP LTE systems, in accordance with some embodiments of the disclosure. FIG. 6 illustrates methods for a UE for UE specific reserved resource signaling, in accordance with some embodiments of the disclosure. With reference to FIG. 3, methods that may relate to UE 330 and hardware processing circuitry 340 are discussed herein. Although the actions in method 500 of FIG. 5 and method 600 of FIG. 6 are shown in a particular order, the order of the actions can be modified. Thus, the illustrated embodiments can be performed in a different order, and some actions may be performed in parallel. Some of the actions and/or operations listed in FIGS. 5 and 6 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 330 and/or hardware processing circuitry 340 to perform an operation comprising the methods of FIGS. 5 and 6. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIGS. 5 and 6.

Returning to FIG. 5, various methods may be in accordance with the various embodiments discussed herein. A method 500 may comprise a processing 510, and a selecting 515, a generating 520. In some embodiments, method 500 may comprise a generating 530.

In processing 510, a configuration transmission carrying a half-tone shifting indicator may be processed. In selecting 515, one or more subcarrier frequencies for UL transmission may be selected based on the half-tone shifting indicator. In generating 520, a UL transmission for the one or more subcarrier frequencies may be generated. The half-tone shifting indicator may have a first value indicating application of a half-subcarrier offset, and a second value indicating no application of the half-subcarrier offset.

In some embodiments, the UE may be configured to have a subcarrier spacing of 15 kHz, and the half-tone shift has a magnitude of 7.5 kHz. For some embodiments, the configuration transmission may be an RRC signaling transmission. In some embodiments, the UL transmission may comprise at least one of: a CP-OFDM waveform, or a DFT-s-OFDM waveform.

In generating 530, an RF shifting indicator for an RF circuitry may be generated based on the half-tone shifting indicator.

Returning to FIG. 6, various methods may be in accordance with the various embodiments discussed herein. A method 600 may comprise a determining 610, a generating 615, a processing 620, and/or a processing 625. In determining 610, one or more subcarrier frequencies to be unused for data allocation may be determined. In generating 615, a UL configuration transmission carrying a reserved resource configuration request indicator may be generated. In processing 620, a DL configuration transmission carrying a reserved resource configuration acknowledgement indicator may be processed. In processing 625, a DL data transmission to be absent from transmission on the one or more subcarrier frequencies to be unused for data allocation.

In some embodiments, at least one of the one or more subcarrier frequencies to be unused for data allocation may correspond with a DC subcarrier frequency of the UE. For some embodiments, the one or more subcarrier frequencies to be unused for data allocation may be continuous in the frequency domain. In some embodiments, the reserved resource configuration request indicator may comprise an indicator of link direction, an indicator of numerology, an indicator of one or more subcarriers in an operating bandwidth of the UE, and/or an indicator of a periodicity of reserved subcarriers in the time domain. In some embodiments, the periodicity of reserved subcarriers may have a value indicating the one or more subcarrier frequencies are to be continuously unused.

Figure 7:
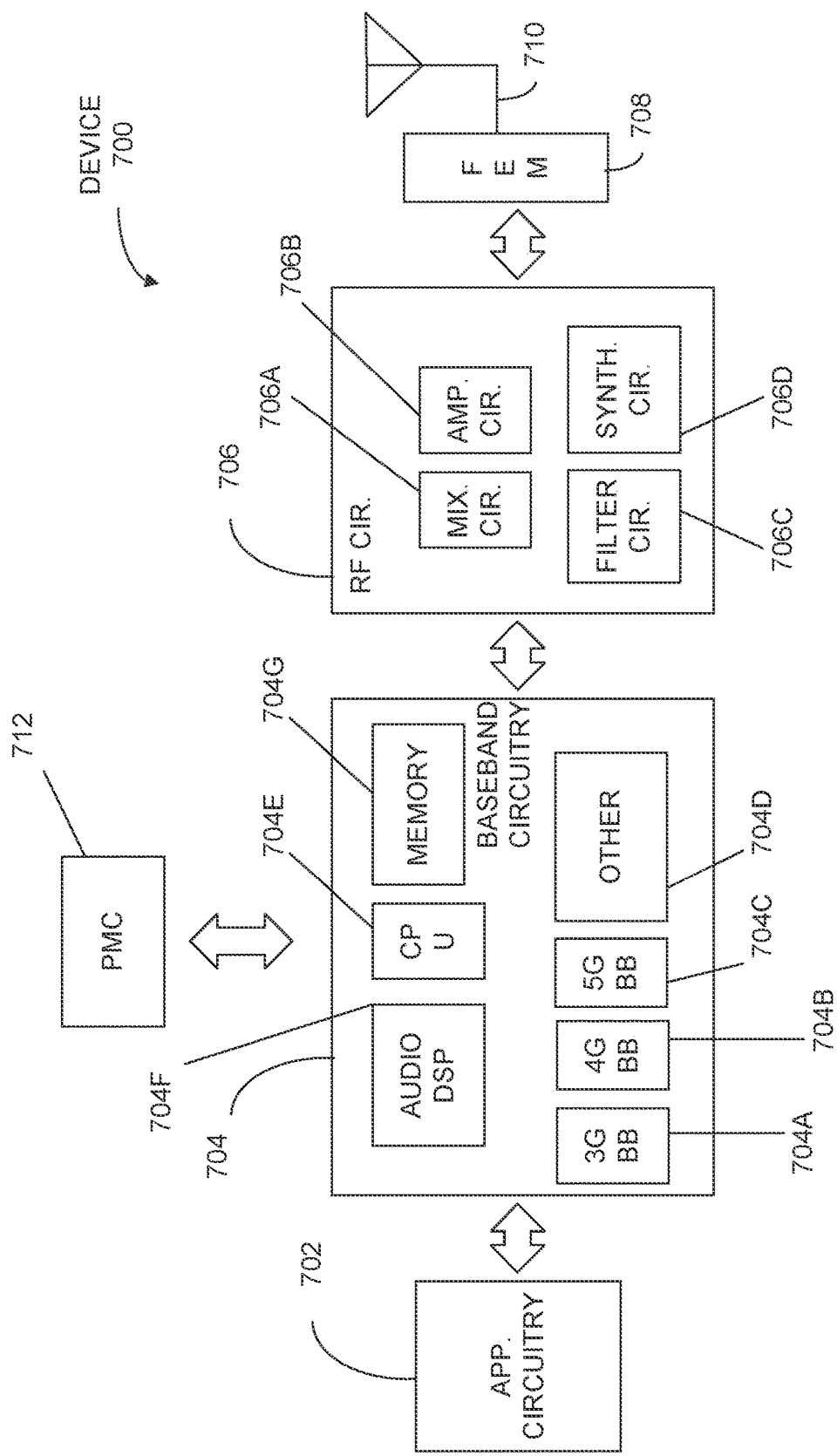
FIG. 7 illustrates example components of a device, in accordance with some embodiments of the disclosure.

FIG. 7 illustrates example components of a device, in accordance with some embodiments of the disclosure. In some embodiments, the device 700 may include application circuitry 702, baseband circuitry 704, Radio Frequency (RF) circuitry 706, front-end module (FEM) circuitry 708, one or more antennas 710, and power management circuitry (PMC) 712 coupled together at least as shown. The components of the illustrated device 700 may be included in a UE or a RAN node. In some embodiments, the device 700 may include less elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, and so on). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), and so on). The baseband circuitry 704 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, and so on. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include one or more audio digital signal processor(s) (DSP) 704F. The audio DSP(s) 704F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, and so on to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the receive signal path of the RF circuitry 706 may include mixer circuitry 706A, amplifier circuitry 706B and filter circuitry 706C. In some embodiments, the transmit signal path of the RF circuitry 706 may include filter circuitry 706C and mixer circuitry 706A. RF circuitry 706 may also include synthesizer circuitry 706D for synthesizing a frequency for use by the mixer circuitry 706A of the receive signal path and the transmit signal path.

In some embodiments, the mixer circuitry 706A of the receive signal path may be configured to down-convert RF signals received from the FEM circuitry 708 based on the synthesized frequency provided by synthesizer circuitry 706D. The amplifier circuitry 706B may be configured to amplify the down-converted signals and the filter circuitry 706C may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706A of the receive signal path may comprise passive mixers, although the scope of the embodiments is not limited in this respect.

In some embodiments, the mixer circuitry 706A of the transmit signal path may be configured to up-convert input baseband signals based on the synthesized frequency provided by the synthesizer circuitry 706D to generate RF output signals for the FEM circuitry 708. The baseband signals may be provided by the baseband circuitry 704 and may be filtered by filter circuitry 706C.

In some embodiments, the mixer circuitry 706A of the receive signal path and the mixer circuitry 706A of the transmit signal path may include two or more mixers and may be arranged for quadrature downconversion and upconversion, respectively. In some embodiments, the mixer circuitry 706A of the receive signal path and the mixer circuitry 706A of the transmit signal path may include two or more mixers and may be arranged for image rejection (e.g., Hartley image rejection). In some embodiments, the mixer circuitry 706A of the receive signal path and the mixer circuitry 706A may be arranged for direct downconversion and direct upconversion, respectively. In some embodiments, the mixer circuitry 706A of the receive signal path and the mixer circuitry 706A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706D may be a fractional-N synthesizer or a fractional N/N+1 synthesizer, although the scope of the embodiments is not limited in this respect as other types of frequency synthesizers may be suitable. For example, synthesizer circuitry 706D may be a delta-sigma synthesizer, a frequency multiplier, or a synthesizer comprising a phase-locked loop with a frequency divider.

The synthesizer circuitry 706D may be configured to synthesize an output frequency for use by the mixer circuitry 706A of the RF circuitry 706 based on a frequency input and a divider control input. In some embodiments, the synthesizer circuitry 706D may be a fractional N/N+1 synthesizer.

In some embodiments, frequency input may be provided by a voltage controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706D of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710. In various embodiments, the amplification through the transmit or receive signal paths may be done solely in the RF circuitry 706, solely in the FEM 708, or in both the RF circuitry 706 and the FEM 708.

In some embodiments, the FEM circuitry 708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

In some embodiments, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device is included in a UE. The PMC 712 may increase the power conversion efficiency while providing desirable implementation size and heat dissipation characteristics.

While FIG. 7 shows the PMC 712 coupled only with the baseband circuitry 704. However, in other embodiments, the PMC 712 may be additionally or alternatively coupled with, and perform similar power management operations for, other components such as, but not limited to, application circuitry 702, RF circuitry 706, or FEM 708.

In some embodiments, the PMC 712 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, and so on. The device 700 goes into a very low power state and it performs paging where again it periodically wakes up to listen to the network and then powers down again. The device 700 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used execute Layer 3, Layer 2, or Layer 1 functionality, while processors of the application circuitry 704 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
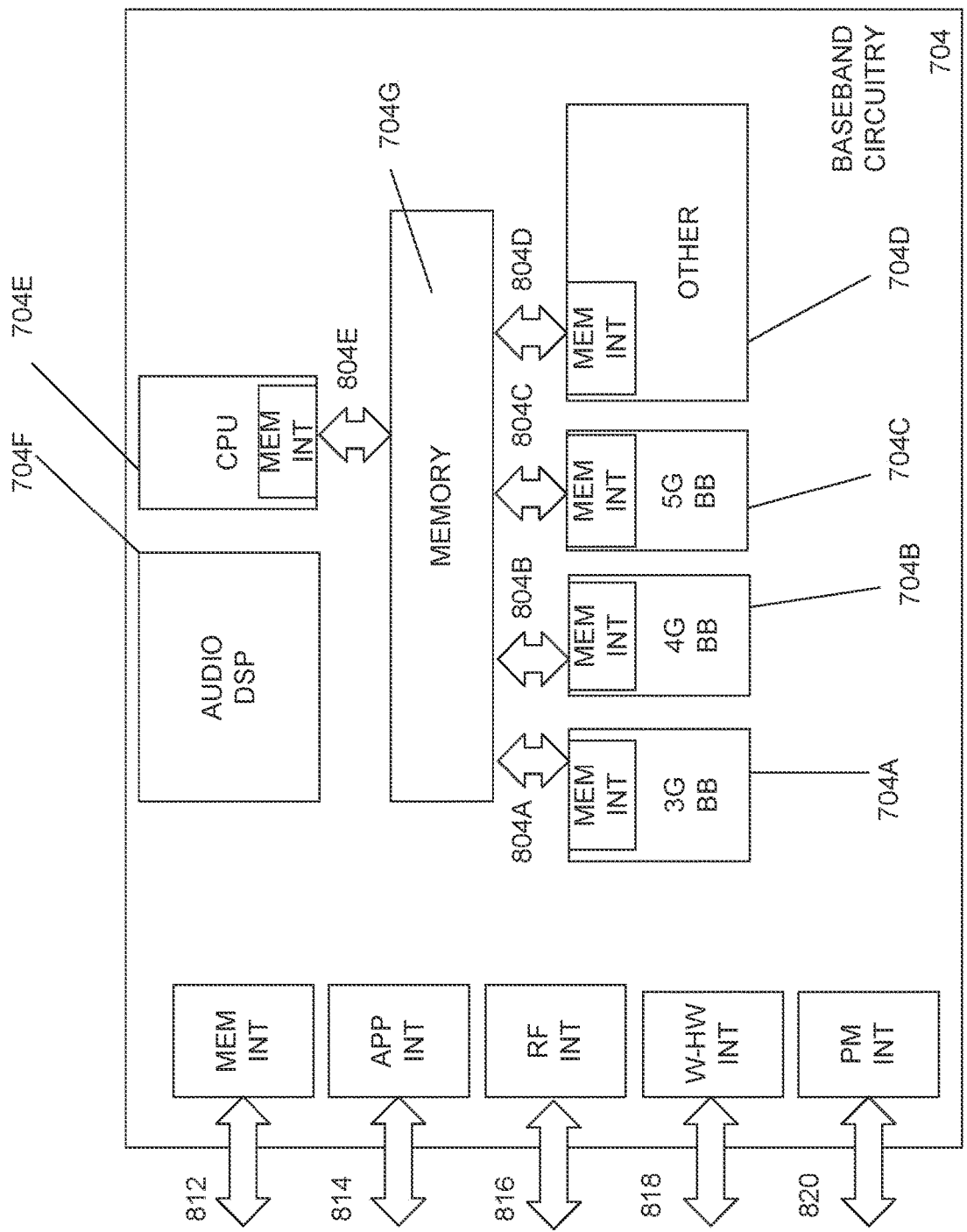
FIG. 8 illustrates example interfaces of baseband circuitry, in accordance with some embodiments of the disclosure.

FIG. 8 illustrates example interfaces of baseband circuitry, in accordance with some embodiments of the disclosure. As discussed above, the baseband circuitry 704 of FIG. 7 may comprise processors 704A-704E and a memory 704G utilized by said processors. Each of the processors 704A-704E may include a memory interface, 804A-804E, respectively, to send/receive data to/from the memory 704G.

The baseband circuitry 704 may further include one or more interfaces to communicatively couple to other circuitries/devices, such as a memory interface 812 (e.g., an interface to send/receive data to/from memory external to the baseband circuitry 704), an application circuitry interface 814 (e.g., an interface to send/receive data to/from the application circuitry 702 of FIG. 7), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMC 712.

It is pointed out that elements of any of the Figures herein having the same reference numbers and/or names as elements of any other Figure herein may, in various embodiments, operate or function in a manner similar those elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of a User Equipment (UE) operable to communicate with a Fifth-Generation Evolved Node B (gNB) on a wireless network, comprising: one or more processors to: process a configuration transmission carrying a half-tone shifting indicator; select one or more subcarrier frequencies for Uplink (UL) transmission based on the half-tone shifting indicator; and generate a UL transmission for the one or more subcarrier frequencies, wherein the half-tone shifting indicator has a first value indicating application of a half-subcarrier offset, and a second value indicating no application of the half-subcarrier offset, and an interface for generating UL sending UL transmission to a transmission circuitry and for receiving DL transmissions from a receiving circuitry.

In example 2, the apparatus of example 1, wherein the UE is configured to have a subcarrier spacing of 15 kilohertz (kHz), and the half-tone shift has a magnitude of 7.5 kHz.

In example 3, the apparatus of any of examples 1 through 2, wherein the configuration transmission is a Radio Resource Control (RRC) signaling transmission.

In example 4, the apparatus of any of examples 1 through 3, wherein the UL transmission comprises at least one of: a Cyclic Prefix Orthogonal Frequency Division Multiplexing (CP-OFDM) waveform, or a Discrete Fourier Transform Spread Orthogonal Frequency Division Multiplexing (DFT-s-OFDM) waveform.

In example 5, the apparatus of any of examples 1 through 4, wherein the one or more processors are to: generate a Radio Frequency (RF) shifting indicator for an RF circuitry based on the half-tone shifting indicator.

Example 6 provides a User Equipment (UE) device comprising an application processor, a memory, one or more antennas, a wireless interface for allowing the application processor to communicate with another device, and a touch-screen display, the UE device including the apparatus of any of examples 1 through 5.

Example 7 provides machine readable storage media having machine executable instructions that, when executed, cause one or more processors of a User Equipment (UE) operable to communicate with an Evolved Node-B (eNB) on a wireless network to perform an operation comprising: process a configuration transmission carrying a half-tone shifting indicator; select one or more subcarrier frequencies for Uplink (UL) transmission based on the half-tone shifting indicator; and generate a UL transmission for the one or more subcarrier frequencies, wherein the half-tone shifting indicator has a first value indicating application of a half-subcarrier offset, and a second value indicating no application of the half-subcarrier offset.

In example 8, the machine readable storage media of example 7, wherein the UE is configured to have a subcarrier spacing of 15 kilohertz (kHz), and the half-tone shift has a magnitude of 7.5 kHz.

In example 9, the machine readable storage media of any of examples 7 through 8, wherein the configuration transmission is a Radio Resource Control (RRC) signaling transmission.

In example 10, the machine readable storage media of any of examples 7 through 9, wherein the UL transmission comprises at least one of: a Cyclic Prefix Orthogonal Frequency Division Multiplexing (CP-OFDM) waveform, or a Discrete Fourier Transform Spread Orthogonal Frequency Division Multiplexing (DFT-s-OFDM) waveform.

In example 11, the machine readable storage media of any of examples 7 through 10, the operation comprising: generate a Radio Frequency (RF) shifting indicator for an RF circuitry based on the half-tone shifting indicator.

Example 12 provides an apparatus of a User Equipment (UE) operable to communicate with an Evolved Node B (eNB) on a wireless network, comprising: one or more processors to: determine one or more subcarrier frequencies to be unused for data allocation; generate an Uplink (UL) configuration transmission carrying a reserved resource configuration request indicator; process a Downlink (DL) configuration transmission carrying a reserved resource configuration acknowledgement indicator; and process a DL data transmission that is absent from transmission on the one or more subcarrier frequencies to be unused for data allocation, and an interface for generating UL sending UL transmission to a transmission circuitry and for receiving DL transmissions from a receiving circuitry.

In example 13, the apparatus of example 12, wherein at least one of the one or more subcarrier frequencies to be unused for data allocation corresponds with a Direct Current (DC) subcarrier frequency of the UE.

In example 14, the apparatus of any of examples 12 through 13, wherein the one or more subcarrier frequencies to be unused for data allocation are continuous in the frequency domain.

In example 15, the apparatus of any of examples 12 through 14, wherein the reserved resource configuration request indicator comprises at least one of: an indicator of link direction; an indicator of numerology; an indicator of one or more subcarriers in an operating bandwidth of the UE; or an indicator of a periodicity of reserved subcarriers in the time domain.

In example 16, the apparatus of example 15, wherein the periodicity of reserved subcarriers has a value indicating the one or more subcarrier frequencies are to be continuously unused.

Example 17 provides a User Equipment (UE) device comprising an application processor, a memory, one or more antennas, a wireless interface for allowing the application processor to communicate with another device, and a touch-screen display, the UE device including the apparatus of any of examples 12 through 16.

Example 18 provides machine readable storage media having machine executable instructions that, when executed, cause one or more processors of a User Equipment (UE) operable to communicate with an Evolved Node-B (eNB) on a wireless network to perform an operation comprising: determine one or more subcarrier frequencies to be unused for data allocation; generate an Uplink (UL) configuration transmission carrying a reserved resource configuration request indicator; process a Downlink (DL) configuration transmission carrying a reserved resource configuration acknowledgement indicator; and process a DL data transmission that is absent from transmission on the one or more subcarrier frequencies to be unused for data allocation.

In example 19, the machine readable storage media of example 18, wherein at least one of the one or more subcarrier frequencies to be unused for data allocation corresponds with a Direct Current (DC) subcarrier frequency of the UE.

In example 20, the machine readable storage media of any of examples 18 through 19, wherein the one or more subcarrier frequencies to be unused for data allocation are continuous in the frequency domain.

In example 21, the machine readable storage media of any of examples 18 through 20, wherein the reserved resource configuration request indicator comprises at least one of: an indicator of link direction: an indicator of numerology; an indicator of one or more subcarriers in an operating bandwidth of the UE; or an indicator of a periodicity of reserved subcarriers in the time domain.

In example 22, the machine readable storage media of example 21, wherein the periodicity of reserved subcarriers has a value indicating the one or more subcarrier frequencies are to be continuously unused.

In example 23, the apparatus of any of examples 1 through 5, and 12 through 16, wherein the one or more processors comprise a baseband processor.

In example 24, the apparatus of any of examples 1 through 5, and 12 through 16, comprising a memory for storing instructions, the memory being coupled to the one or more processors.

In example 25, the apparatus of any of examples 1 through 5, and 12 through 16, comprising a transceiver circuitry for at least one of: generating transmissions, encoding transmissions, processing transmissions, or decoding transmissions.

In example 26, the apparatus of any of examples 1 through 5, and 12 through 16, comprising a transceiver circuitry for generating transmissions and processing transmissions.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

The invention claimed is:

1. A User Equipment (UE) operable to communicate with a base station on a wireless network, comprising:
   one or more processors configured to:
      process a configuration transmission carrying a half-tone shifting indicator, wherein the configuration transmission is by a higher layer signaling;
      select one or more subcarrier frequencies for Uplink (UL) transmission based on the half-tone shifting indicator; and
      generate a UL transmission for the one or more subcarrier frequencies, wherein the half-tone shifting indicator indicates whether to apply a half-subcarrier offset or not; and
   an interface for sending the UL transmission to a transmission circuitry and for receiving downlink (DL) transmissions from a receiving circuitry.

2. The UE of claim 1, wherein the one or more processors are further configured to:
   determine a subcarrier spacing and a magnitude of the half-tone shift based on the configuration transmission.

3. The UE of claim 2, wherein the one or more processors are further configured to:
   determine that the subcarrier spacing is 15 kilohertz (kHz) and the magnitude of the half-tone shift is 7.5 kHz.

4. The UE of claim 1, wherein the one or more processors are further configured to:
   determine a magnitude of the half-tone shift based on the one or more subcarrier frequencies.

5. The UE of claim 1,
   wherein the configuration transmission is a Radio Resource Control (RRC) signaling transmission.

6. The UE of claim 1,
   wherein the UL transmission comprises at least one of: a Cyclic Prefix Orthogonal Frequency Division Multiplexing (CP-OFDM) waveform or a Discrete Fourier Transform Spread Orthogonal Frequency Division Multiplexing (DFT-s-OFDM) waveform.

7. The UE of claim 1, wherein the one or more processors are further configured to:
   generate a Radio Frequency (RF) shifting indicator for an RF circuitry based on the half-tone shifting indicator.

8. A method of operating a user equipment (UE), comprising:
   processing a configuration transmission carrying a half-tone shifting indicator, wherein the configuration transmission is by a higher layer signaling;
   selecting one or more subcarrier frequencies for Uplink (UL) transmission based on the half-tone shifting indicator; and
   generating a UL transmission for the one or more subcarrier frequencies, wherein the half-tone shifting indicator indicates whether to apply a half-subcarrier offset or not.

9. The method of claim 8, further comprising:
   determining a subcarrier spacing and a magnitude of the half-tone shift based on the configuration transmission.

10. The method of claim 9, further comprising:
    determining that the subcarrier spacing is 15 kilohertz (kHz) and the magnitude of the half-tone shift is 7.5 kHz.

11. The method of claim 8, further comprising:
    determining a magnitude of the half-tone shift based on the one or more subcarrier frequencies.

12. The method of claim 8,
    wherein the configuration transmission is a Radio Resource Control (RRC) signaling transmission.

13. The method of claim 8,
    wherein the UL transmission comprises at least one of: a Cyclic Prefix Orthogonal Frequency Division Multiplexing (CP-OFDM) waveform or a Discrete Fourier Transform Spread Orthogonal Frequency Division Multiplexing (DFT-s-OFDM) waveform.

14. The method of claim 8, further comprising:
    generating a Radio Frequency (RF) shifting indicator for an RF circuitry based on the half-tone shifting indicator.

15. A base station comprising:
    a transceiver configured to enable wireless communication with a user equipment (UE); and
    a processor, communicatively coupled to the transceiver, and configured to:
       generate a configuration transmission carrying a half-tone shifting indicator, wherein the half-tone shifting indicator corresponds to one or more subcarrier frequencies;
       transmit, using the transceiver, the configuration transmission to the UE via a higher layer signaling; and
       receive, using the transceiver, an Uplink (UL) transmission through the one or more subcarrier frequencies,
       wherein the half-tone shifting indicator indicates whether to apply a half-subcarrier offset or not.

16. The base station of claim 15, wherein the configuration transmission indicates a subcarrier spacing and a magnitude of the half-tone shift.

17. The base station of claim 16, wherein the subcarrier spacing is 15 kilohertz (kHz) and the magnitude of the half-tone shift is 7.5 kHz.

18. The base station of claim 15, wherein the configuration transmission is a Radio Resource Control (RRC) signaling transmission.

19. The base station of claim 15, wherein the UL transmission comprises at least one of: a Cyclic Prefix Orthogonal Frequency Division Multiplexing (CP-OFDM) waveform or a Discrete Fourier Transform Spread Orthogonal Frequency Division Multiplexing (DFT-s-OFDM) waveform.

20. The base station of claim 15, wherein the higher layer signaling includes a Minimum System Information (MSI) transmission or a Remaining MSI (RMSI) transmission, and wherein the MSI transmission or the RMSI transmission indicates whether or not to apply the half-subcarrier offset.

* * * * *